April 11, 1961 C. E. EPPINGER ET AL 2,979,361
TRUCK BOX COVERS
Filed Aug. 10, 1959 2 Sheets-Sheet 1
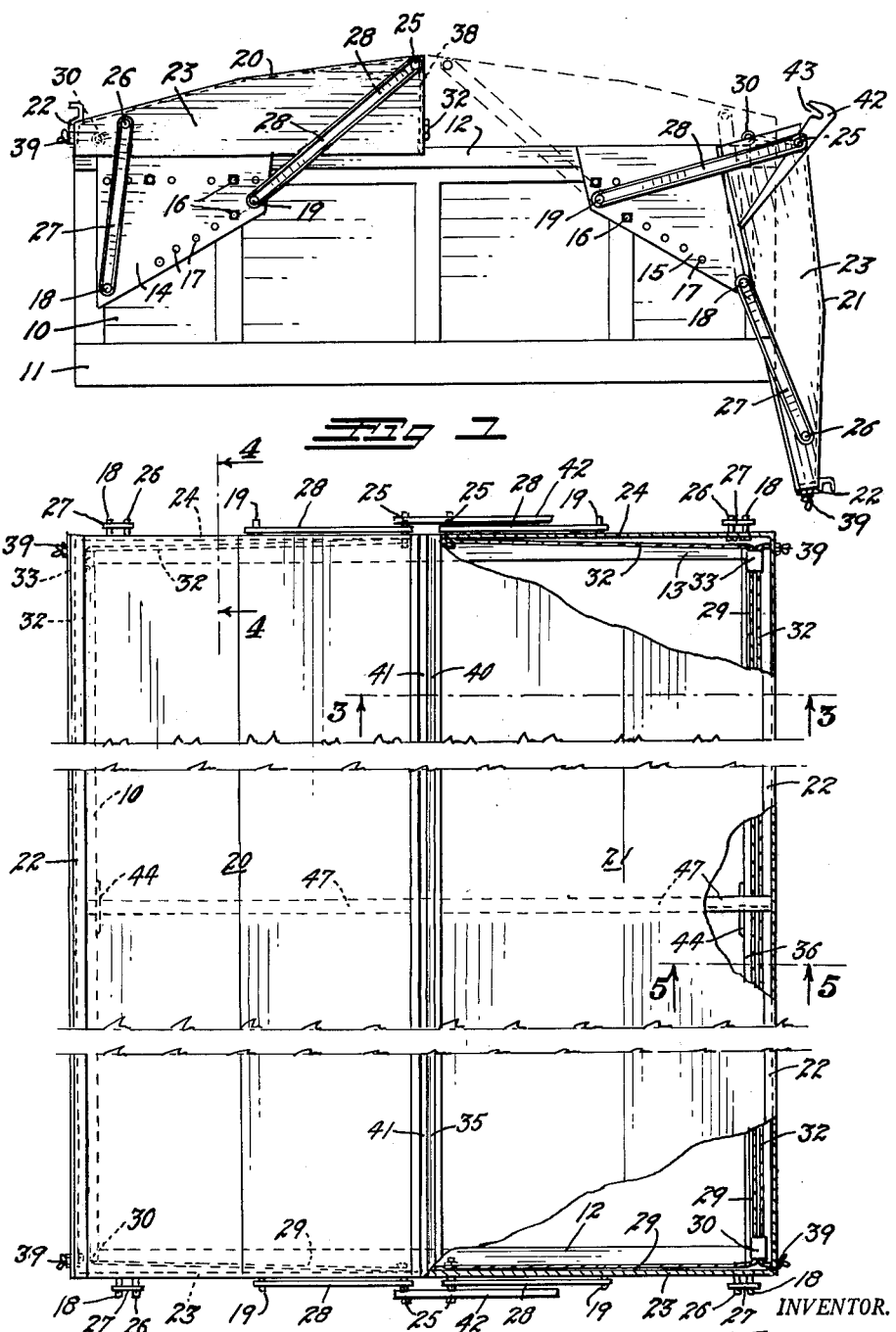
INVENTOR.
CHARLES E. EPPINGER
EDWIN G. FLANAGIN
BY
ATTORNEY

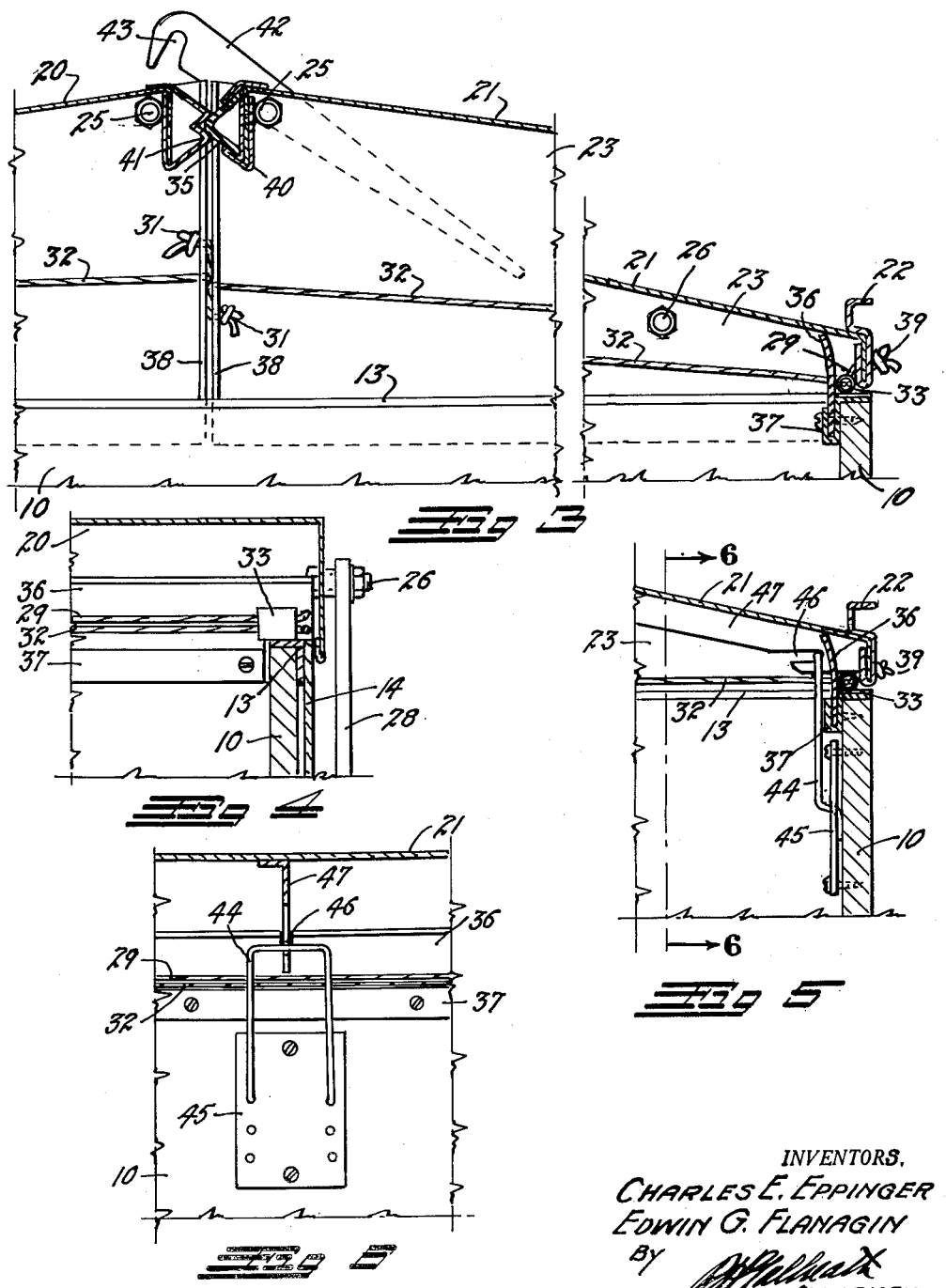

2,979,361
TRUCK BOX COVERS

Charles E. Eppinger, 3240 S. Utica St., Denver, Colo., and Edwin G. Flanagin, Gem, Kans.

Filed Aug. 10, 1959, Ser. No. 832,786

4 Claims. (Cl. 296—100)

This invention relates to a cover for the box of an automotive truck or trailer and is more particularly designed for use on grain trucks of the type used for hauling bulk grain such as wheat. It is, however, not limited to this particular use but will be found useful upon any vehicle box where it is desired to protect the load from spillage, contamination or from inclement weather conditions.

The principal object of the invention is to provide a highly efficient, weather-proof cover mechanism which can be quickly, easily and economically installed upon the load box of a vehicle and which can be readily opened to allow full access to the entire top of the box for loading and unloading purposes and which can be easily and quickly closed to cover and maintain a "heaped" load of grain against loss and to protect the load from the weather.

Another object of the invention is to provide a cover mechanism which will eliminate the use of the conventional tarpaulins and which will remain in place upon the box at all times and to provide a cover which, when in the open position, will lie close to the sides of the box so as not to interfere with loading and unloading.

Other objects and advantages reside in the detail construction of the invention, which is designed for simplicity, economy, and efficiency. These will become more apparent from the following description.

In the drawing:

Fig. 1 is an end view of a conventional vehicle body box showing the invention in place thereon in a partially opened position;

Fig. 2 is a fragmentary plan view thereof with the improved cover in the fully closed position and partially broken away to show the interior construction;

Fig. 3 is an enlarged, fragmentary cross section through the cover taken on the line 3—3, Fig. 2;

Fig. 4 is a similar cross section taken on the line 4—4, Fig. 2;

Fig. 5 is a similar cross section taken on the line 5—5, Fig. 2; and

Fig. 6 is a detail section taken on the line 6—6, Fig. 5.

A conventional vehicle body box is indicated at 10 resting on a vehicle chassis bed 11. The invention is designed to be fitted upon the box 10 to provide a cover for the latter which can be readily opened and closed.

The invention is applied by mounting a front horizontal angle member 12 along and upon the front wall of the box 10 and a second similar horizontal angle member 13 along and upon the rear wall of the box 10. Two downwardly extending, spaced apart, apron plates 14 and 15 are welded or otherwise secured to each of the angle members 12 and 13 so as to extend downwardly and exteriorly of the front and back of the box. The angle members, with their apron plates, are secured to the box in any desired manner, such as by means of suitable lag screws 16 threaded into the front and back wall structures of the box. The apron plates are provided with a plurality of lag screw openings 17 so that a proper position selection may be made of the lag screws for any given box.

The apron plates 14 and 15 may have any suitable shape. As illustrated, they have a five sided contour so that each will provide a support for an outer lower link stud 18 and an inner upper link stud 19. The link studs 18 and 19 may be mounted on the apron plates 14 and 15 in any desired manner, such as by welding or by means of clamping nuts threaded thereon, so as to project horizontally outward from the apron plates.

The cover proper is formed in two similar elongated sheet metal parts which will be herein designated, in their entireties, as a left cover 20 and a right cover 21. The covers are similar and each comprises a closed inclined sheet metal roof portion, the outer side edges of which are clamped in edge stiffening members 22. A front wall plate 23 joins the side edge of each cover and extends downwardly from the front edge of each roof portion to close the fronts of the covers and a similar rear wall plate 24 joins the side edge of each cover and extends downwardly from the rear edge of each roof portion to close the rears of the covers.

When in the closed position on the truck box 10, the front and rear wall plates extend downwardly beyond and below the angle members 12 and 13 in overlapping relation therewith, as shown in Fig. 4, and the edge stiffening members are supported above the sides of the box, as shown in Fig. 5. The sides are sealed by means of flexible rubber sealing strips 36 mounted in channel members 37 secured along the upper edges of the sides of the box as shown in Fig. 5.

An inner cover stud 25 projects rigidly and horizontally outward from adjacent the inner and upper extremity of each of the front and rear plates 23 and 24 and an outer cover stud 26 similarly projects outwardly from adjacent the outer extremity of each of the front and rear wall plates 23 and 24. An outer shorter connecting link 27 hingedly connects each of the outer cover studs 26 with the outer lower link stud 18 therebelow and an inner longer connecting link 28 hingedly connects each of the inner cover studs 25 with the inner upper link stud 19 on the apron plate 14 therebelow. The links can be secured on their respective studs in any desired manner such as by means of cotter keys, threaded nuts or other common mechanical means.

When the covers 20 and 21 are in the closed position, all of the connecting links incline inwardly toward the center line of the box, the longer links 28 being positioned on a greater incline than the shorter links 27. To open one of the covers 20 or 21, the latter is simply pulled sidewardly and outwardly from the center line of the box. The first movement causes the upper extremities of all links to swing upwardly, due to their inward incline. The difference in incline between the shorter links 27 and the longer links 28 causes the longer links 28 to swing the inner edge of the cover upwardly and outwardly over the side of the box until the cover comes to rest with the lower edges of the front and rear wall plates 23 and 24 resting against the outer lower link studs 18 with the weight of the cover supported by the shorter connecting links 27, as shown at the right of Fig. 1.

Thus, it can be seen that when closed, the covers 20 and 21 will cover a "heaped" load in the box and will completely cover the box. When in the open position, the covers will hang substantially vertical close to the sides of the box. The covers require but a minimum of side clearance when swinging between their terminal positions so that they can be operated in relatively close quarters.

The average length of a conventional grain body is 14 feet and the average width is approximately 8 feet. Therefore, the covers 20 and 21 are relatively long (approx. 4' x 14' each) and it is advisable to provide some means for causing the covers to move as rigid units without twisting regardless of where the lifting force is applied.

The twist-resisting means illustrated consists of two flexible members such as nylon cords or ropes applied to each of the covers. A first flexible member 29 is connected, in any suitable manner adjacent the inside front corner of each cover. The first flexible members 29 extend outwardly from the inside front corners through front slip sleeves 30 mounted adjacent the outer extremities of the front angle member 12 thence along the sides of the box 10 and through similar rear slip sleeves 33 mounted adjacent the outer extremities of the rear angle member 13, thence secured to the covers in any desired manner.

A second flexible member 32 is connected adjacent the inside rear corner of each cover. The second flexible members extend outwardly from the inside rear corners through rear slip sleeves 33, thence along the sides of the box and through the first slip sleeves 30 to the outside front corners of the covers where they are secured in any desired manner. As illustrated, the inner extremities of the flexible members are knotted, as shown at 31, through and about vertical stop flanges 38 formed on the inner extremities of the front and rear wall plates and the outer extremities of the flexible members are passed through openings in the edge stiffening members 22 and knotted as shown at 39.

It can be seen that the flexible member will transmit tension from any corner of any cover to the diagonally opposite corner thereof without imparting a twist or distortion to the cover. For instance, let us assume that the cover 21 is gripped adjacent its rear extremity and pulled outwardly to open the cover. This outward pull will be simultaneously transmitted through the first flexible member 29 to the front of that cover so that the cover will move outwardly uniformly throughout its length without twist or strain. The same action takes place when an open cover is lifted to the closed position. A lifting movement imparted to one extremity of a cover will be simultaneously transmited to the other extremity through one of the flexible members.

The covers are provided with suitable weather-stripping along their inner edges to protect the load. As illustrated, a flexible bowed compressible rubber sealing strip 35 is mounted in a channel frame 40 along the inner edge of the cover 21 and a strip-receiving grooved member 41 is mounted along the inner edge of the cover 20. As the covers move inwardly to the closed position, the strip 35 will be pressed into the groove of the member 41 as shown in Fig. 2 to form a weather-tight joint.

Since the covers are relatively large and comparatively light in weight, means must be provided for preventing them from being blown open and damaged by wind pressure. This is accomplished in the embodiment illustrated by mounting a hook lever 42 on one of the inner cover studs 25 at the front and rear. The hook levers 42 are provided with notches 43 positioned to engage the inner cover stud 25 of the other cover to draw the two covers together and lock them in place.

The covers are prevented from being wind-blown upwardly by two U-shaped wire bales 44, there being one bale mounted in an attachment plate 45 secured inside of each side wall of the box 10. The bales are engaged by a notch 46 formed in a strengthening rib 47 extending transversally of each cover as the covers move inwardly to the closed position.

It will be noted that the covers do not rest upon the box 10 at any time for in all positions the entire weight of the covers is supported by the connecting links 27 and 28. Therefore, all vibrating contacts between the box and the covers are eliminated.

Since the flexible members 29 and 32 extend along the box sides in side-by-side relation and since they move simultaneously in opposite directions, they provide an ideal means for operating the covers from power-driven rotatable drums on the sides of the box if power operation of the covers is desired.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. A cover mechanism for covering a truck box of the type having two side walls joined by two end walls comprising: a cross member arranged to be positioned on each end wall so as to extend transversally of said body at the ends thereof; a first cover member arranged to be positioned over and along one side wall and resting at its extremities on said cross members and covering substantially one half of said box; a similar second cover member arranged to be positioned along the other side of said box and resting on said cross members and substantially covering the remaining half of said box; a pair of swinging links suspended from each extremity of each cover member; apron plates secured to and extending downwardly from said cross members forwardly and rearwardly of said box, therebeing one of said apron plates at each extremity of each cover member; and studs projecting outwardly from said apron plates, said links being hingedly mounted at their lower extremities on said studs, the outside link of each pair of links being shorter than the inside link of that pair and the studs for the shorter links being positioned at a lower elevation on said apron plates than the studs for the longer links.

2. A cover mechanism as described in claim 1 in which the cross members have a right angle cross section to provide a horizontal portion for resting on said end walls and a vertical portion for the attachment of said apron plates.

3. A cover mechanism as described in claim 2 having an end plate in each extremity of each cover member and a pair of studs projecting outwardly from each end plate upon which the upper extremities of a pair of links are rotatably mounted, said studs being positioned closer to the center line of said box than the studs in said apron plates so that all of said links will incline inwardly toward said center line when said cover members are in place on said box, so that said links will swing said cover members first upwardly as they move outwardly.

4. A cover mechanism for covering a truck box of the type having two side walls joined by two end walls comprising: a cross member arranged to be positioned on each end wall so as to extend transversally of said body at the ends thereof; a first cover member arranged to be positioned over and along one side wall and resting at its extremities on said cross members and covering substantially one half of said box; a similar second cover member arranged to be positioned along the other side of said box and resting on said cross members and substantially covering the remaining half of said box; a pair of swinging links suspended from each extremity of each cover member; means for hingedly suspending said links from said cross members forwardly and rearwardly of said box so as to support said cover members when the latter are swung toward and away from each other; a slip means mounted on each cross member adjacent the extremities thereof; a first flexible member extending from an attachment to the forward inner corner of each cover member through said slip means to an attachment to the rear outer corner of the cover member; and a second flexible member extending from an attachment to the rear inner corner of each cover member through said slip means to an attachment to the forward outer corner of the cover member said flexible members acting to transmit vertical movements of opposite direction between the diagonally positioned corners of the cover members to prevent twist and distortion of the latter.

References Cited in the file of this patent

UNITED STATES PATENTS 2,759,761     Dandini _____ Aug. 21, 1956

FOREIGN PATENTS 338,485     Switzerland _____ July 15, 1959